Figure 1:
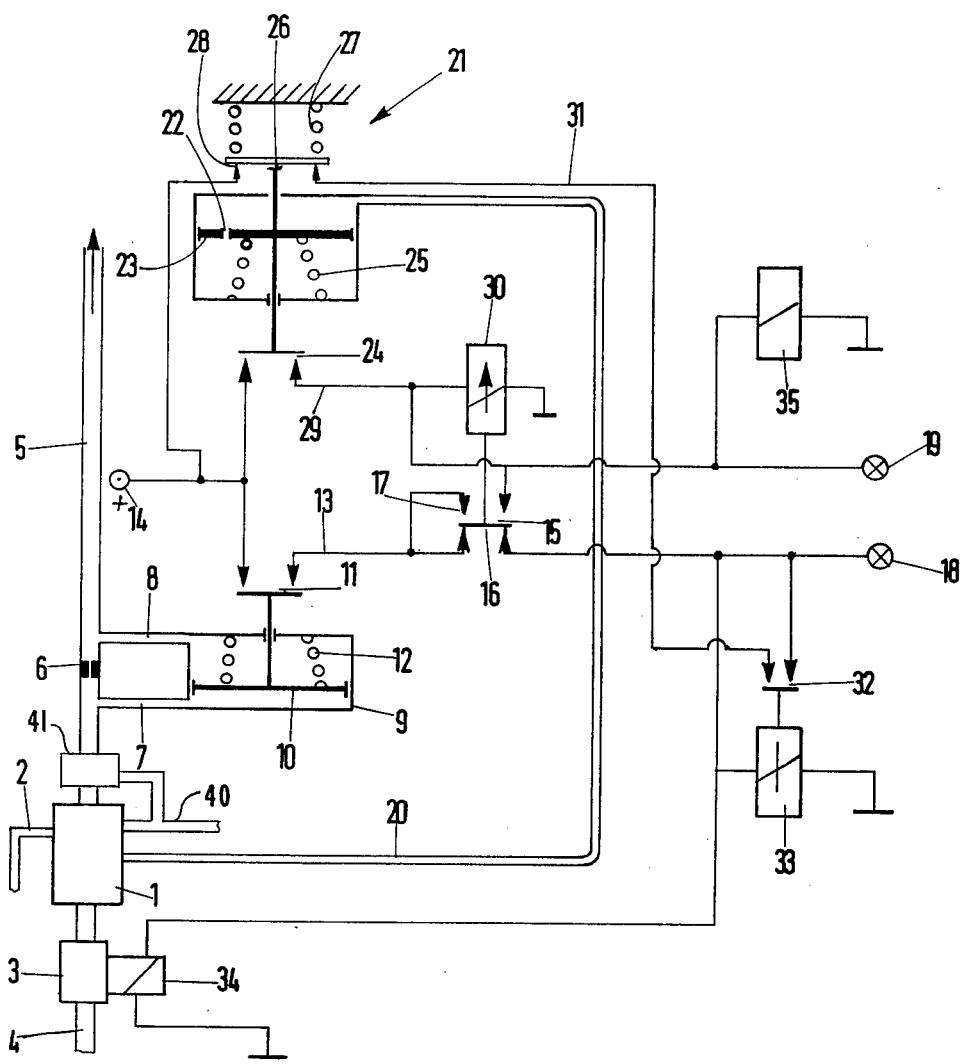

United States Patent [19]

Falke

[11] 3,957,314
[45] May 18, 1976

[54] DEVICE FOR MONITORING THE FLOW IN THE AIR LINE OF AN AIR BRAKE SYSTEM ON A RAILWAY VEHICLE

[75] Inventor: Erich Falke, Munich, Germany
[73] Assignee: Knorr-Bremse GmbH, Munich, Germany
[22] Filed: Nov. 25, 1974
[21] Appl. No.: 526,738

[30] Foreign Application Priority Data
Nov. 24, 1973 Germany............................ 2358612

[52] U.S. Cl...................................... 303/3; 303/86
[51] Int. Cl.² ........................................ B60T 13/74
[58] Field of Search .................................. 303/1–3, 303/59–60, 66–67, 69, 84, 81, 86; 116/55, 70

[56] References Cited
UNITED STATES PATENTS

| | | | |
|---|---|---|---|
| 1,869,020 | 7/1932 | Nettleton ......................... | 116/55 X |
| 3,560,057 | 2/1971 | Worbois .............................. | 303/67 |
| 3,724,913 | 4/1973 | Levy .................................... | 303/3 X |

Primary Examiner—Trygve M. Blix
Assistant Examiner—Douglas C. Butler
Attorney, Agent, or Firm—Edmund M. Jaskiewicz

[57] ABSTRACT

The pressure in an air line in an air braking system for a railway vehicle is controlled by an operator's brake valve which is also constructed to maintain the pressure therein. A pressure monitor is responsive to the pressure drop across a restrictor in the air line or in a supply line leading from a source of compressed air. A control line is connected to an energy source through a shut-off device operable by the pressure monitor and through a two-position switch to be connected to a monitor device for brake release operation or to a second monitor device for the flow of air in the air line caused by defects or application of the emergency brake. The shut-off switch will move to the energy passing position only when a certain pressure difference in the restrictor is excceded. The two-position switch is actuated by the operator's brake valve and connects the brake release monitor device to the control line only when the operator's brake valve is in its brake release position. Otherwise, the two-position switch connects the control line to the monitor device for defect-originated air flow.

10 Claims, 2 Drawing Figures

U.S. Patent   May 18, 1976   3,957,314

DEVICE FOR MONITORING THE FLOW IN THE AIR LINE OF AN AIR BRAKE SYSTEM ON A RAILWAY VEHICLE

The present invention relates to an air brake system for railway vehicles having an operator's brake valve to control the pressure in the air line, more particularly, to the monitoring of the flow of air in the air line.

It is an essential operating feature of the conventional air braking system for railway vehicles that when the main air line is emptied into the atmosphere such as would occur upon the emergency application of brakes or upon a separation between cars of the train there must be a rapid, automatic and strong application of the air brakes. However, when the air braking system is equiped with an operator's brake valve which controls the pressure in the main air line and thus acts to maintain pressure therein, the brake valve will operate to resupply compressed air into the air line upon the emptying of the air line as described above. This supplying of air to the air line at the same time that the air line is being evacuated will hinder and delay the automatic and rapid application of the brake. In order to limit such a hindering effect to a relatively low level agreements have been made between various railroads to limit the resupplying action of the operator's brake valve to certain values. This limitation has the disadvantage that even when in the brake release position, the operator's brake valve is capable of supplying into the air line only a quantity of compressed air per unit of time which corresponds to this limited value. Thus the time required to replenish the air supply in the air line is unduly lengthened and is not an optimum characteristic for the proper operation of such a compressed air braking system.

In order to obtain the fastest possible release of the air brakes in a railway vehicle and thus to avoid the abovementioned disadvantages, it has been proposed to eliminate the limitation of throttling the replenishing function of the operator's brake valve. This meant that the operator's brake valve was now capable of operating to the full capacity of the resupplying line and thus could exert a powerful opposing action to the lowering of pressure in the air line from other points therein and might hinder any emergency braking operation that should occur as a result of such lowering of pressure. In order that the operator may have at least some indication that a defect is present in the braking system which requires emergency braking, a flow indicator was provided in the air line to give an optical or acoustic signal as an indication of a defect. The flow indicators generally comprise a restrictor in the air line or the supply line leading to the air line from a source of comprssed air and a flow monitor was positioned to be actuated upon a predetermined pressure drop across the restrictor.

However, this arrangement had the disadvantage that the flow of air in the air line which would actuate the flow indicator occurred not only when there was a defect in the air system which necessitated emergency braking but also during a normal rapid release of the brakes. This rapid release of the brakes accompanied by a rapid resupplying of the reservoirs through the air line will produce a sufficient rate of flow in the air line to actuate the flow indicator as might be expected because of the high resupply performance of the operator's brake valve as described above. Thus, in the event of any emergency, the operator must first quickly notice the signal produced by the flow indicator and he must then interpret correctly as to whether this signal is an indication of an emergency or of a brake release operation. If the operator determines that an emergency exists, he must then interrupt the resupplying of the operator's brake valve by applying the brakes. The correct interpretation of the signal is particularly difficult under these circumstances especially toward the end of a release operation since even when the brakes on the vehicle occupied by the operator are already fully released other brakes on other cars of the train may only be partially released. These partially released brakes will cause a high flow of air in the air line that will produce an actuation of the flow indicator.

The German Pat. No. 1 605 272 discloses a flow indicator for the purpose described above. Although this flow indicator can be adjusted to various flow pressure lines on different operator's brake valve structures, it is not capable of eliminating the requirement that the operator make a rapid decision as to whether a signal by the flow indicator is due to a release operation or due to an emergency.

It is therefore the principal object of the present invention to provide a novel and improved flow-responsive monitoring device of the type described herein.

It is another object of the present invention to provide a device for monitoring the flow in an air line of an air brake system on a railway vehicle which enables the operator to reliably determine whether the signal on the flow indicator is caused by an emergency or caused by a normal brake release operation.

According to one aspect of the present invention in a device for monitoring the flow in an air line of an air brake system on a railway vehicle there is an operator's brake valve to control pressure in an air line leading from a source of compressed air and movable between brake release and brake applied positions. Pressure sensing means is provided which is responsive to a pressure drop in a restrictor located in the air line. A first control line extends from an energy source and includes first switch means responsive to the pressure sensing means for passing energy therethrough only when a predetermind pressure difference across the restrictor is exceeded. A second switch means is connected to the first switch means and has a first normally closed position and a second normally open position. Connected to the first position of the second switch means is means for indicating a brake release operation. Means are provided responsive to an increase in pressure at the operator's brake valve for connecting the second switch means through said first switch means to the source of energy so that the brake release indicating means is energized only when the operator's brake valve is in the brake release position. Means are connected to the normally closed first position of the second switch means for indicating a defect-originated flow of air in the air line when there is a predetermined pressure drop across the restrictor.

According to the present invention, when a predetermined high rate of flow occurs in the air line the monitoring or indicating device for brake release will respond if there is a brake release operation occurring through the operator's brake valve. The monitoring device for defect-originated air flow in the air line will respond only when the air flow is caused by other reasons, such as the abovementioned emergencies. Accordingly, the operator of the vehicle no longer is required to make a decision as to the cause for the indicated air flow but the cause is now clearly indicated to him.

Other objects and advantages of the present invention will be apparent from the accompanying description when taken in conjunction with the following drawing, which is exemplary.

Figure 2:
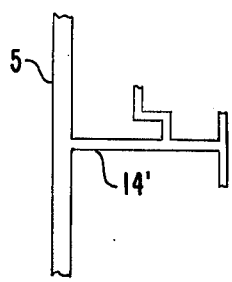

FIG. 1 is a schematic representation of an embodiment of the monitoring device of the present invention; and FIG. 2 is a view of a portion of FIG. 1 showing a pneumatic source for the control circuit.

As may be seen in the drawing, there is an operator's brake valve 1 which can be set by means of a hand lever 2 into at least one braking, at least one drive or non-braking and/or at least one release position. The brake valve 1 is connected through a solenoid valve 3 and a supply pipe 4 to a source of compressed air which is not illustrated. The other side of the valve 1 is connected to a main air line 5 in which is located a restrictor 6 in the vicinity of the valve 1. Branching off on the air line 5 in both the front and behind restrictor 6 are control lines 7 and 8 which lead to a pressure monitor 9 having a piston 10 therein so that the control lines act on both sides of the piston.

The piston 10 is coupled by means of its shaft to an electric shut-off switch 11. Within the pressure monitor 9 is a spring 12 acting upon the piston 10 in the direction to urge the switch 11 to the open position. Thus, the switch 11 will be opened when the piston 10 is subjected to a predominant pressure from behind restrictor 6 through control line 8 and this opening will be assisted by spring 12. Accordingly, the pressure monitor 9 together with the switch 11 forms an electric pressure-differential switch.

The switch 11 is in a control line 13 leading from a source of electrical energy 14 and through a two-position or change-over switch 15 having sets of contacts 16 and 17. The control line 13 may be connected through contact 16 to a monitoring or indicating device 18 for a defect-originated flow of air in the air line or through contact 17 to a monitoring or indicating device 19 for the brake release operation.

The operator's brake valve 1 is also provided in a manner known in the art and which is therefore not described in further detail with a servo control circuit at 40 whose pressure level can be selectively controlled by means of the handle 2 and a relay valve 41 that is controlled by the pressure in the servo control circuit to control the pressure in air line 5. Connected to this known servo control circuit is a pneumatic control line 20 which leads to a second electric pressure differential switch 21. The switch 21 comprises a piston 23 through which passes a throttling nozzle 22. The piston 23 is also connected through its shaft to a switch 24 employed as a shut-off device. The piston 23 is loaded in the closing direction of the switch 24 by means of the pressure in the control line 20 and in the open direction of switch 24 by the nozzle 22 and by the force of a spring 25 acting against the piston. Acting in the direction opposite to the closing of switch 24 the piston 23 is connected by means of an abutment coupling 26 to a switch 28 which is maintained in a normal closed position by a spring 27.

The switch 24 of the pressure differential switch 21 is located in a second electric control line 29 leading from the electric current source 14 to the monitoring device 19 for brake release and to a relay coil 30 which when energized switches the two-position switch 15 in the direction to close contact 17.

A third electric control line 31 leads from the current source 14 through switch 28 and to a further switch 32 connected in series thereto to the monitoring device 18 for defect-originated flow of air in the air line. To the control line 31 there are connected in parallel a relay coil 33 which upon being energized closes switch 32 and a magnet coil 34 of the solenoid valve 3 that is closed when the coil is energized. If the vehicle equipped with this monitoring device is a locomotive or other form of driving vehicle there may be connected a coil 35 of a relay that is not otherwise shown in detail to the control line leading to monitoring device 19. When the relay of coil 35 is energized it limits the driving power of the vehicle to a predetermined low value.

When the brake has been released and is ready for operation, the operator's brake valve 1 will admit compressed air at a regular pressure into the air line 5 and the control line 20. In this state, only relatively low leakage losses in the air braking system are to be replaced and at most there will be a low rate of flow of air in the air line 5 which flow will cause a non-substantial pressure drop across restrictor 6. The piston 10 of pressure monitor 9 will thus be subjected to almost equal pressures on both sides thereof and a spring 12 will hold the switch 11 in the open position. There will also be equal pressures on both sides of piston 23 of the pressure differential switch 21 so that the spring 25 will hold switch 24 open and switch 27 will hold switch 28 closed. The relay coil 30 will not be energized and thus the contact 16 of two-position switch 15 will be closed. Also, relay coils 33 and 35 will not be energized and thus switch 32 will be open and any limitation on the driving power will be ineffective. Solenoid valve 3 is open and neither of the monitoring devices 18 or 19 will be energized.

If the handle 2 of the operator's brake valve is set to a brake position in order to apply the brakes, the valve 1 will thus lower the prevailing pressure in the control line 20 and air line 5 corresponding to the stage of braking which has been set. Although a pressure drop may occur at restrictor 6, the pressure monitor 9 will not change its position since any such pressure drop will act on piston 10 in a direction to open the switch 11. The switch 28 on the pressure differential switch 21 may be opened until the pressure is equalized through the nozzle 22. However, the opening of switch 28 will not have any effect since the switch 32 is also open. Again, both monitoring devices 18 and 19 will not be energized.

When the handle 2 of the operator's brake valve 1 is set to the drive position for the subsequent release of the brakes from the braking position, the brake valve 1 will again admit a regular pressure level into the control line 20 and the air line 5. Since it will now be necessary to introduce a large quantity of compressed air into the braking system there will be a strong flow of air in air line 5 which will in turn produce a considerable pressure drop at restrictor 6. This pressure drop acting through control lines 7 and 8 will be sufficient to cause piston 10 to close the switch 11.

Previous to the closing of switch 11, the pressure increase in control line 20 will act directly against piston 23 of pressure differential switch 21 to close the switch 24. This will energize relay coil 30 which in turn will move th switch 15 to close contacts 17. The closing of contact 17 will now energize brake release monitor 19 and will also energize relay coil 35 to limit the driving power of the vehicle. If the switch 11 is now closed as described above, there will be no change in the state of energization of the monitoring device.

After the passage of a relatively short period of time the pressure will become equalized on both sides of piston 23 as a result of a throttling through the nozzle 22 and the pressure differential switch 21 will now return to its original or normal position wherein switch 24 is open. However, there will be a pressure drop across restrictor 6 until the flow of compressed air in air line 5 ceases. This pressure drop acting through piston 10 will maintain switch 11 closed and therefore through control line 13 and switch 17 monitoring device 19 for brake release will continue to be energized together with relay coils 30 and 35. Only after the flow of air in air line 5 ceases which will occur upon the completion of the release operation in the entire coupled train will the pressure drop across restrictor 6 also disappear so as to enable spring 12 to again open switch 11. The opening of switch 11 will bring about a de-energization of the brake release monitoring device 19 as well as the relay coils 30 and 35 and the entire monitoring device will return to its starting position as shown in the drawing.

The operation of the monitoring device of the present invention will next be described in the condition when the brake is released and ready foar operation and there occurs a flow of air from air line 5 into the atmosphere because of a breakdown or defect in the air braking system of the train or through opening of an emergency braking valve. When the flow of air in air line 5 exceeds a certain value the operator's brake valve 1 which is in the release position will initially supply compressed air from the source of compressed air into the air line 5. This flow of air in the line 5 will produce a pressure drop across restrictor 6 which pressure drop will shift piston 10 of pressure monitor 9 in the direction to close switch 11. The closing of switch 11 would then connect control line 13 to the energy source 14 to energize defect-originated flow monitoring device 18 and to also energize relay coil 33 and coil 34 of relay valve 3 through contact 16 which are in the normally closed position. The energization of coil 33 will close switch 32 to produce a parallel control circuit through line 31 to energize monitoring device 18 from current source 14 through closed switches 28 and 32.

The energization of coil 34 would close solenoid valve 3 which will block the supply of compressed air to operator's brake valve 1 so that the valve 1 can no longer supply compressed air into the air line 5 and thus, cannot hinder any further the lowering of pressure in the air line. As a result, a fast and powerful lowering of pressure will occur in the air line 5 because of the flow of compressed air to the atmosphere. This lowering of pressure will enable the brakes of the vehicle to be applied rapidly and forcefully. Since the supply of compressed air into the air line 5 is now shut off the pressure drop across restrictor 6 will disappear which will then cause the pressure monitor 9 to return to its original position under the force of spring 12 wherein the switch 11 will be open. However, the defect-originated indicator 18 together with relay coil 33 and solenoid valve 3 will remain energized through control line 31 because of the closed switches 28 and 32. Upon being warned by the energized indicator 18, the operator will now switch brake valve 1 into a braking position and thus will lower the pressure in the servo control circuit in the brake valve 1. The pressure in control line 20 will also be lowered which will produce a pressure difference on piston 23 because of the nozzle 22 and the piston 23 will be shifted in the direction to open switch 28 through the abutment coupling 26. The opening of switch 28 will interrupt the energy flow through control line 31 to indicator 18 and also to relay coil 33 and to solenoid valve 3. As a result, these components will return to their initial positions. Within a short time the pressure will also be equalized on both sides of piston 23 through nozzle 22 and the spring 27 will again close switch 28 and piston 23 will be urged back into its normal position. All components of the monitoring device will now be in their original and normal positions as shown in the drawing.

It is therefore apparent that the indicator 18 for defectoriginated flow of air in the air line is energized only when the air line 5 is vented because of an emergency. A supply of compressed air into the air line will be interrupted automatically in such a case until, after the flow of air in the air line ceases, the operator acknowledges the energizing of indicator 18 by switching brake valve 1 into a brake position. On the other hand, if a flow of air appears in air line 5 because of a brake release operation voluntarily produced by the operator by proper manipulation of brake valve 1, then only the indicator 19 for the brake release will be operated and will remain energized until the flow of air in air line 5 produced by the release operation disappears.

It is noted that the monitoring device of the present invention indicates every brake release resulting by the operator's manipulation of the brake valve. The invention does not indicate only the release operations which will cause a strong flow of compressed air in the air line. This is accomplished by the second shut-off device 24 in the second control line 29 leading form the energy source to the brake release monitoring device 19. The second shut-off device 24 is switched by the operator's brake valve through the energy passing condition only when the brake valve is in the brake release position and if the two-position switch has a relay that can be switched in response to the passage of energy in the second control line. As a result, the brake release monitor device 19, independently of the setting of the operator's brake valve to a release or a driving position, will automatically remain energized as long as the flow of air initiated by the release operation continues in the air line.

The second shut-off device 24 is switched by a piston subjected to pressure from the servo control circuit which pressure is unthrottled in the switching direction for the passage of energy and throttled by a nozzle in the opposite direction.

In order to interrupt as soon as possible and automatically the resupply of air into the air line in the case of an emergency, the defect-originated indicating device 18 closes the shut-off valve 3 in the supply line e 4 when energized. Also a third control line 31 is provided which leads from the source of energy 14 to the monitoring device 18 and in which there is connected in series a third shut-off device 28 which can be switched to block the passage of energy in response to the operator's brake valve only when this valve is in the brake position. A fourth shut-off device 32 is switched to pass energy only when energy is applied to the defect-originated indicator 18.

The monitors or indicators 18 and 19 may be optical indicators, such as warning and/or control lamps or may be acoustic indicators or a combination of both. In addition, an additional solenoid valve may be provided in parallel with solenoid valve 3 which additional valve upon being energized will open a vent to the atmosphere in air line 5 to assist in the rapid evacuation of the air line and thus bring about the rapid braking of the vehicle in the case of an emergency.

In the abovedescribed embodiment, the monitoring device comprises electrical circuitry energized by a source of electric current for operation. However, the control circuit may also be operated pneumatically and can be connected to the air supply of the braking system as at 14' shown in FIG. 2. so as to avoid the additional expense and construction of a further electrical device on the railroad vehicle. In such a pneumatic system switch 11 as well as switches 24, 28, and 32 would be pneumatic shut-off valves. Electrical control lines would be pneumatic control lines and the two-position switch 15 would be a change over or two-position valve as well as relay and magnet coils 30, 33, 34 and 35 as servo cylinders. The entire monitoring device would then be operated purely pneumatically through a connection to pipe 4 which leads to the source of air.

Thus, the monitoring device is capable of being energized by either electrical or pneumatic energy. The monitoring device presents a simple and reliable solution to the problem as defined above.

It will be understood that this invention is susceptible to modification in order to adapt it to different usages and conditions, and accordingly, it is desired to comprehend such modifications within this invention as may fall within the scope of appended claims.

What is claimed is:

1. In a device for monitoring the flow in an air line of an air brake system on a railway vehicle, th combination of an air line connected to a source of compressed air and an operator's brake valve therein to control pressure in said air line and movable between brake release and brake applied positions, a restrictor in said air line, pressure sensing means responsive to a pressure drop in said restrictor, a first control line including a first switching means responsive to said pressure sensing means and connected to a source of energy for passing energy therethrough only when a predetermined pressure difference across said restrictor is exceeded, second switching means connected to said first switching means and having a first normally closed position and a second normally open position, means connected to said first position of said second switching means for indicating a brake release, means responsive to an increase in pressure at said operator's brake valve for connecting said second switching means through said first switching means to said source of energy whereby said brake release indicating means is energized only when said operator's brake valve is in the brake release position, and means connected to said normally closed first position of said second switching means for indicating a defect-originated flow of air in the air line when a predetermined pressure drop occurs across said restrictor.

2. In a device as claimed in claim 1 and a third switching means in a second control line connected between said energy source and said brake release indicating means, means for actuating said third switching means into the energy passing condition only when said operator's brake valve is in the brake release position, said second switching means including a relay energized in response to the passage of energy in said second control line.

3. In a device as claimed in claim 2 and a servo control circuit having a selective operating pressure level connected to said operator's brake valve, a relay valve in said air line and responsive to the pressure in said servo control circuit to control the pressure in said air line, a piston actuated by the pressure in said servo control line to actuate said third switch means, said piston having a throttle opening therein to throttle pressure in the direction to open said third switch means and the pressure acting unthrottled in the direction to close said third switch means.

4. In a device as claimed in claim 2 and a shut-off valve in said air line and closed when said defect-originated indicating means is energized, a third control line from said source of energy to said defect-originated indicating means, fourth switch means in said third control line operable to a position to block the passage of energy in said third control line only when said operator's brake valve is in a braking position, and fifth switch means in said third control line operable to a position to pass energy therethrough only when said defect-originated indicating means is energized.

5. In a device as claimed in claim 4 wherein said fourth switch means is switched by said piston to an energy blocking position when said piston is subjected to an unthrottled pressure through said servo control circuit.

6. In a device as claimed in claim 5 and a first spring means constantly acting on said third switch means for loading thereof into the energy blocking position, and second spring means constantly acting on said fourth switch means for loading thereof into the energy passing position.

7. In a device as claimed in claim 4 wherein said fifth switch means is connected to said brake release indicating means for limiting the driving power of a driving railway vehicle to a low value when energized.

8. In a device as claimed in claim 4 wherein said energy source comprises a source of electrical energy, said first, third and fourth switch means each comprises electric pressure-differential switches, said second and fifth switch means each comprises electric relay switches, said shut-off valve comprises a solenoid valve.

9. In a device as claimed in claim 1 wherein said brake release and defect-originated indicating means each comprise an optical indicator.

10. In a device as claimed in claim 1 wherein said energy source comprises a fluid pressure source.

* * * * *